Aug. 10, 1954 — J. R. OISHEI ET AL — 2,685,776
VACUUM SYSTEM FOR ACCESSORY OPERATION
AND CRANKCASE VENTILATION
Filed June 12, 1953

INVENTORS
JOHN R. OISHEI
and MARTIN BITZER
BY
Bean, Brooks, Buckley & Bean,
ATTORNEYS.

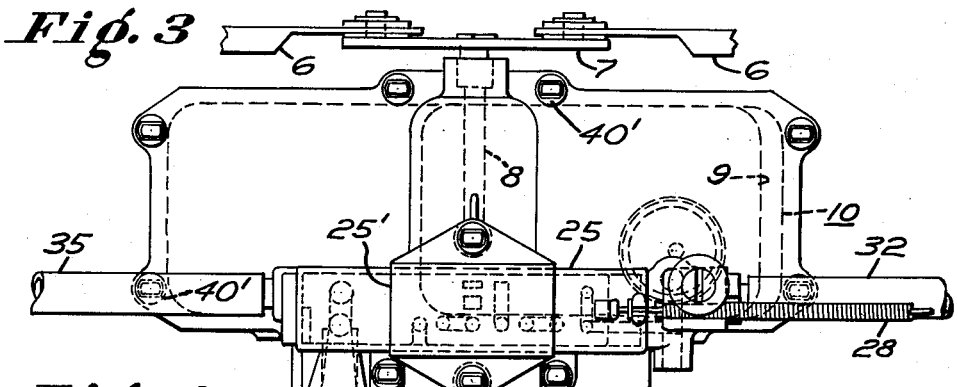
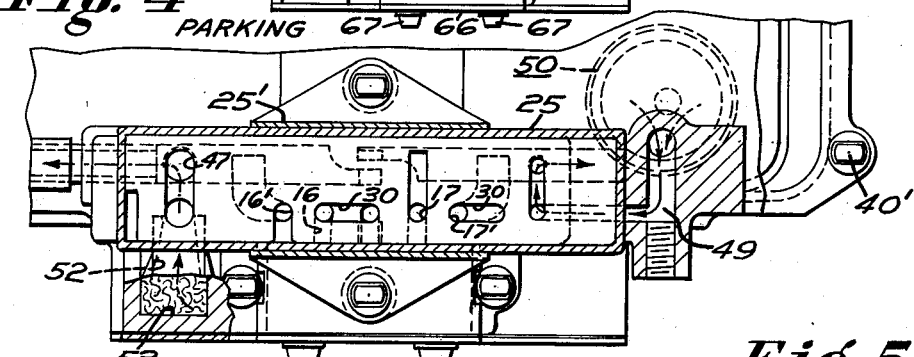
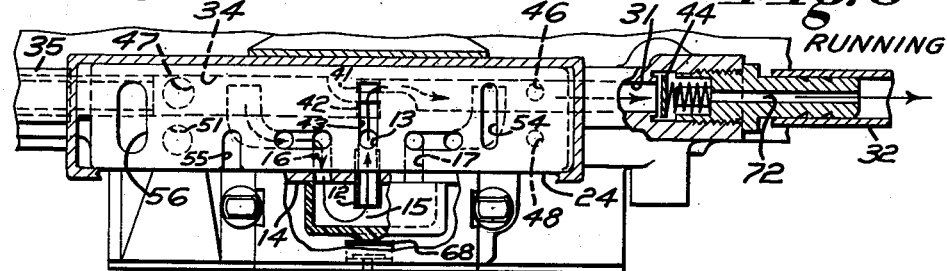
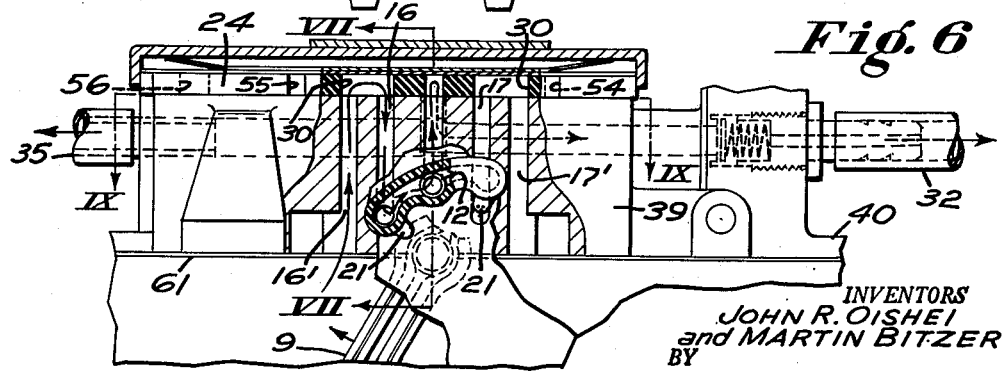

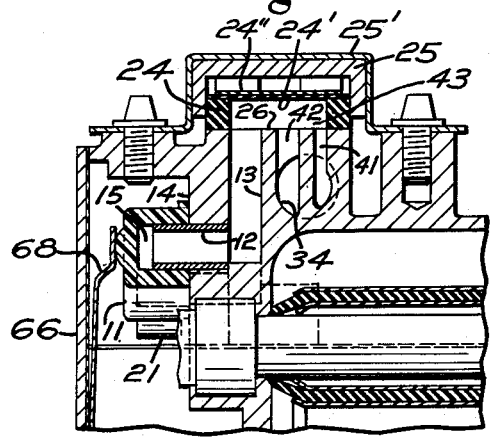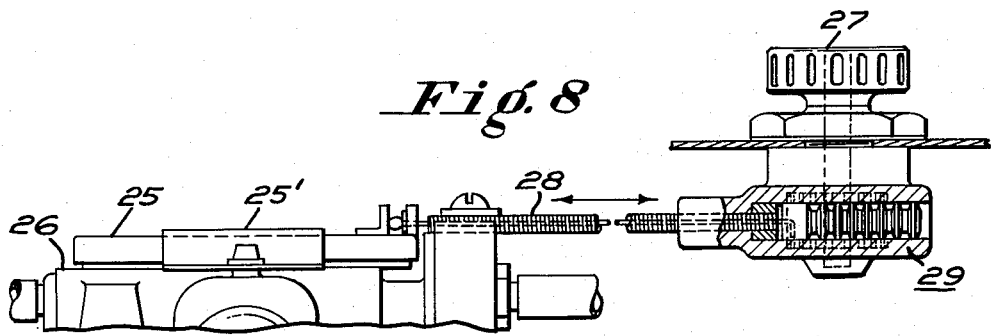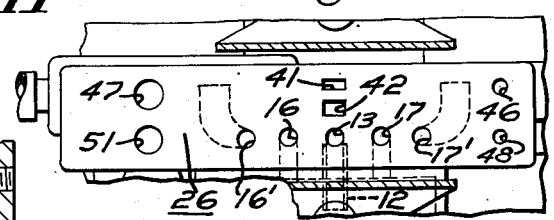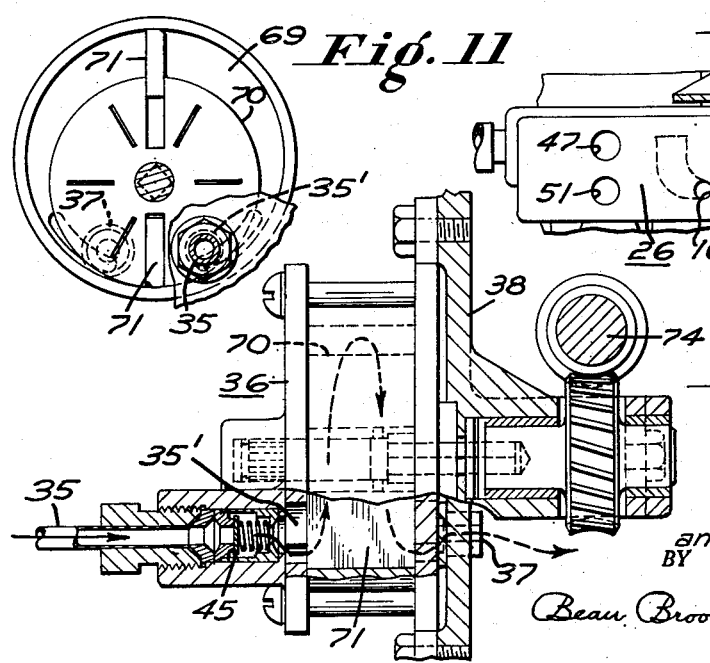

Patented Aug. 10, 1954

2,685,776

UNITED STATES PATENT OFFICE 2,685,776

VACUUM SYSTEM FOR ACCESSORY OPERATION AND CRANKCASE VENTILATION

John R. Oishei, Buffalo, and Martin Bitzer, Kenmore, N. Y.; said Bitzer assignor to Trico Products Corporation, Buffalo, N. Y.

Application June 12, 1953, Serial No. 361,146

10 Claims. (Cl. 60—60)

This invention relates to a windshield cleaner system for motor vehicles and especially to one which is operable by suction from off the intake manifold of a power plant of a vehicle. Normally, in the suction operated windshield wiper connected to the manifold, during periods of acceleration the depression in the intake manifold is raised by the opening of the carburetor control, with the result that the vacuum available for windshield wiper operation diminishes to a point where the wiper may be halted. It has been proposed to utilize an auxiliary source of suction in the form of an engine driven pump connected into the suction line between the accessory and the intake manifold, an arrangement in which the accessory is subjected to the constant influence of the pump during long periods of idleness of the accessory.

The primary object of this invention is to provide in a practical manner alternate sources of power for the windshield wiper motor to insure the operation of the accessory under all conditions of engine operation.

A further object of the invention is to provide a windshield cleaner by which the secondary source of suction, such as an engine driven pump, may be wholly disconnected from the accessory when the wiper is parked in an arrested position, the burden of holding the wiper parked being placed solely upon the intake manifold.

Further, the invention relates to an accessory system operable from the internal combustion power plant of a motor vehicle wherein the ventilation of the engine crankcase is assured whether or not the accessory is in operation, provision being made for utilizing a windshield wiper motor-embodied filtering structure of substantial size and shape to insure at all times and under all conditions the delivery of clean air to the crankcase and to the wiper for protecting the parts of the two mechanisms.

In carrying out the teachings of this invention, according to the illustrated embodiment, the wiper motor is provided with two suction lines or conduits opening into the opposite ends of the wiper motor control valve housing, one line extending from the intake manifold and the other from a power driven rotary pump, the two conduits opening through individual ports arranged side-by-side in the valve seat for being jointly connected to the automatic valve mechanism of the motor. The control valve is arranged to alternately use either the pump or the manifold to operate the wiper; both may be used simultaneously. A check valve in the manifold line is spring pressed to normally close it. When the pump is turning at a low R. P. M. and the manifold vacuum is high, the manifold suction can overcome the spring pressure on the valve and, under those circumstances, the wiper may be operated by the suction of the manifold. Also included in the line is a check valve mounted on the connection leading to the pump whereby any suction applied from the manifold will close the latter check valve to avoid drawing any air or oil out of the pump over into the accessory. This double check valve system provides the unique feature that when the windshield wiper is shut off, the pump is ported to the windshield wiper filter which is so designed as to enable the construction of an enlarged filter body, for example, an elongated felt liner substantially 5/8" square and approximately 5" long, to be removably inserted in a self-contained filter compartment in the wiper motor. When the wiper is parked, an atmospheric passage is opened to admit free air to the pump for the time that the wiper is shut off. In this way, both the wiper and the pump will receive filtered air through the single filter. It is therefore a further object to provide a fluid motor unit installable as such and having a self-embodied filter capable of conjoint use by the crank case ventilating pump as well as the windshield cleaner.

The foregoing and other objects will manifest themselves as this description progresses, reference being made herein to the accompanying drawings, wherein Fig. 1 is a fragmentary view showing the general layout of the improved windshield cleaner system;

Fig. 3 is a fragmentary view showing the wiper motor in top plan view;

Fig. 4 is an enlarged sectional view as taken about on line IV—IV of Fig. 2, showing the valve porting when the control valve is in its wiper parking position;

Fig. 5 is a view similar to Fig. 4 but showing the control valve in its wiper running position and with the idling manifold suction dominating that of the pump;

Fig. 6 is a fragmentary elevation of the wiper motor, partly in section, showing the valve porting for wiper operation;

Fig. 7 is a cross sectional view taken about on line VII—VII of Fig. 6;

Fig. 8 is a fragmentary view showing the manual actuator for the control valve;

Fig. 9 is a plan view of the control valve seat, parts being shown in section as on line IX—IX of Fig. 6;

Fig. 10 is a sectional view through the engine crankcase and its supported suction pump; and Fig. 11 is a fragmentary showing of the pump with one head or side of the pump being removed to a large extent.

Figure 1:
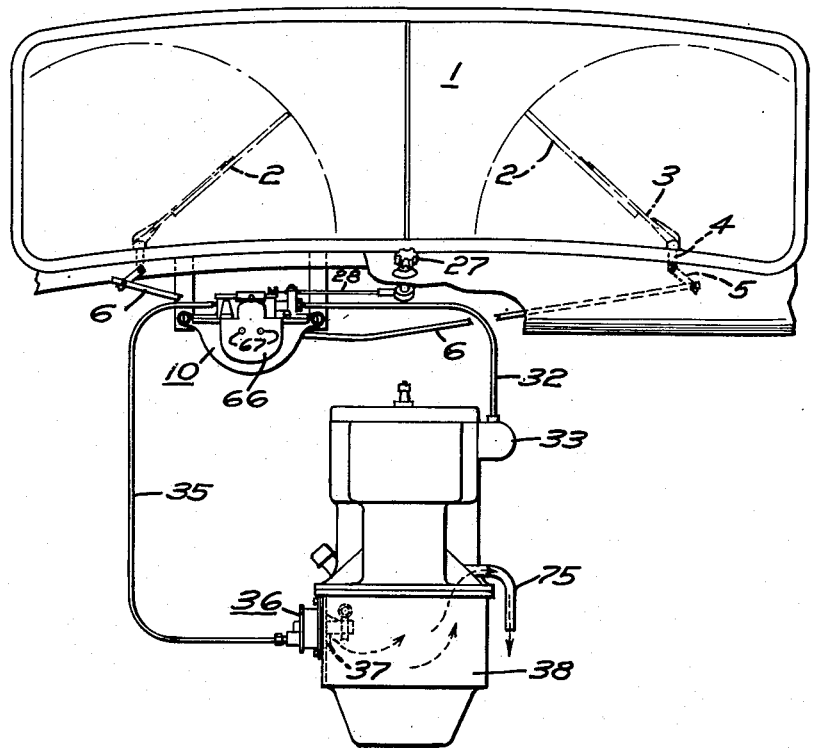

Referring more particularly to the drawings, the numeral 1 designates the windshield of a motor vehicle, 2 the windshield wipers, 3 the wiper carrying arms, and 4 their rockshafts which latter have rocker arms 5 fixed thereon and joined by links 6 to a double throw crank arm 7 on the motor shaft 8. The wiper motor illustrated has a vane type piston 9 fixed upon the shaft 8 within the arcuate shaped motor chamber 10 for receiving fluid pressure impulses upon its opposite side faces in alternation and as directed by an automatic valve mechanism which latter includes a hollow motor valve 11 that is rockable upon a tubular stub-shaft 12 and has communication therethrough with a suction-supply port 13. The valve has an open face movable upon and closed by the valve seat 14, Fig. 5, for alternately registering its hollow or passage 15 with motor chamber ports 16 and 17 therein when the valve is rocked in a well-known manner, as by a kicker 19 having a cam portion 20 on which ride the follower lugs 21 of the valve, the kicker being mounted upon the motor shaft for limited rocking under the urge of an oscillatory toggle spring device 22. As the motor shaft rocks in one direction, it will carry the kicker with it until the spring device goes through a point of greatest distortion in crossing a dead center position, with respect to the two pivot axes 8 and 23, whereupon the toggle spring device will snap the kicker quickly to its other limit position and in so doing will rock the motor valve to its second operative position for reversing the fluid pressure differential on the piston 9.

A motor control valve having a ported valving member 24 and an inclosing housing 25 therefor is slidable upon a valve seat 26 on the motor. The valving member 24 may be economically formed of a strip of rubber or other suitable material and be provided with openings therethrough, with a superimposed plate 24' serving to close the openings at the upper side. A backing spring 24" lightly bears upon the composite valving member to press it upon its seat. The valve may be moved on its seat by a hand knob 27 acting through a Bowden wire 28 and a connecting rack and pinion unit 29. The control valve is confined to its seat by an overlying guiding strap 25' and when the valve is in the motor running position it will serve to connect each chamber port to a respective extension passage 16', 17' by means of valve passages 30. These extensions, which together with the chamber ports 16 and 17 open through the valve seat 26, communicate with the motor chamber 10 at opposite sides of the piston 9. When the valve passage 15 registers with the motor port 16 to establish communication between a source of suction and the corresponding side of the motor chamber, then the motor port 17 will be uncovered to the atmosphere, and conversely, when the valve passage 15 registers with the motor port 17 then the port 16 will be uncovered. The foregoing construction is generally shown in an earlier Patent No. 2,617,146.

According to the present invention, the wiper motor is designed for connection both to the intake manifold of the vehicle engine and to a suction pump driven by the engine as alternate sources of operating pressure, one source increasing its pressure supply with the throttling of the engine and the other source increasing its supply of pressure when the engine is accelerated; the arrangement being such as to favor the dominating source while protecting the accessory system against the passage of fluid thereinto from either source. To this end the wiper motor is provided with two independent supply passages, one indicated at 31 and connected by a conduit 32 to the intake manifold 33 and the other designated 34 and connected by a conduit 35 to the engine driven pump 36 which latter discharges through an exhaust passage 37 into the engine crankcase 38. The manifold passage 31 and the pump passage 34 may be cored from opposite directions into a raised pad 39 on the motor cover 40 and are shown in Fig. 5 as having their inner ends overlapping and opening side-by-side in ports 41 and 42, respectively, in the valve seat 26 adjacent the suction supply port 13 for being connected thereto by the valve passage 43 when the control valve is in its running position. Each of the passages 31 and 34 has a spring seated check valve closing toward the interposed wiper motor, the manifold check valve 44 being disposed in the motor and the pump check valve 45 being located at the pump but both acting to provide unidirectional flow of air from the motor and precluding the pump pulling fuel over from the manifold.

For use when the wiper is arrested, the valve seat 26 is provided with four additional ports, namely, a parking suction supply port 46 opening from the manifold passage 31, a suction port 47 opening from the pump passage 34, a parking chamber port 48 leading through passage 49 to a parking seat 50 within the motor chamber, and a filtered air supply port 51 communicating through a passage 52 with a filter compartment 53. The valving slide member 24 is formed with three additional passages, namely, a connecting passage 54 for the parking ports 46 and 48, an atmospheric passage 55 for opening into the extension passage 17', and a second connecting passage 56 for joining the ports 47 and 51. When the control valve 24 is in its wiper arresting or parking position, the three valve passages 54, 55 and 56 will function first to cause the motor piston 9 to engage its parking seat 50 and secondly to provide the pump 36 with filtered air in a quantity that will be adequate for practical crankcase ventilation.

Figure 2:
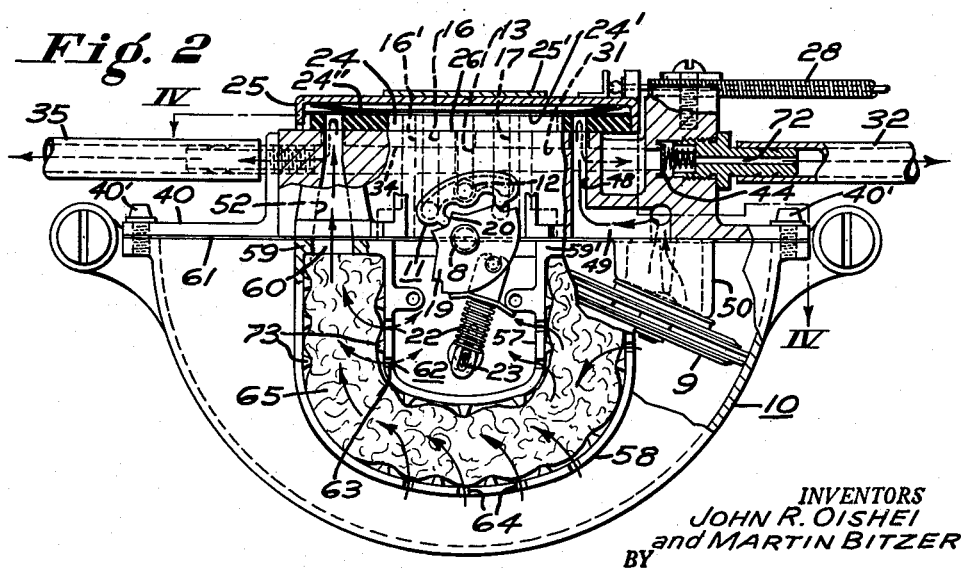
Fig. 2 is an elevation partly in section of a cleaner motor utilizing the present invention.

An ample supply of filtered air is insured by providing a filter chamber of sufficient size on the wiper motor without unduly enlarging it to such an extent as to make it difficult to install in the already crowded space underlying the instrument panel. As shown in Fig. 2, the filter chamber is U-shape, the same having inner and outer walls 57 and 58, respectively, that are joined at their ends by transverse walls 59, 59'. The wall 59 is formed with an outlet opening 60 over which the passage 52 seats when the cover 40 is placed on the motor chamber or body 10. For this reason the passage 52 is formed in an overhanging part of the pad 39. After the placement of the cover on the body, and with the aid of an interposed gasket 61, an airtight joint will be effected upon the tightening of the screws 40'. The U-shaped filter chamber partially encircles the automatic valve action 19, 22, and defines a chamber 62 therefor. The inner wall 57 is provided with air flow slots 63 while the outer wall 58 has like slots 64 circumferentially spaced therefrom to compel the inflowing air to travel a circuitous path through the filter body 65 before entering the chamber ports 16, 17 or before entering the pump-connected passage 52. A cover plate 66 is secured in place by fasteners 67 to close both the filter chamber and the valve chamber, such cover plate carrying a spring finger 68 for bearing upon and lightly holding the valve 11 in position on its tubular shaft 12.

The pump may be of any approved form, although that illustrated is of the rotary type, the same having a chamber 69 with a rotor 70 therein which latter slidably carries the impeller vanes 71 to move in a counterclockwise direction, in Fig. 11, to pull the air in through the inlet port 35' from the accessory and to discharge it through the outlet port 37 into the crankcase 38.

In operation, to start the cleaner the motorist will turn the knob 27 to shift the valve to the position shown in Figs. 5 and 6 wherein the two sources of suction, the pump 36 and the manifold 33, will have joint communication through the valve passage 43 to the supply port 13 through the valve passage 15 and the connected one of the ports 16, 17. Such communication will be extended to the motor chamber at the respective side of the piston 9, the opposite side of the motor chamber being opened to the atmosphere through the uncovered chamber port. At an idling speed the manifold suction will preferably dominate the pump generated suction, at which time the manifold check valve 44 will unseat while the pump check valve 45 will seat. As the engine is accelerated and the pump is turned over at a higher speed the pump suction will dominate the manifold suction to open the check valve 45 and to close the valve 44. In between there will be a theoretical point at least where both check valves will unseat concurrently. If desired, the manifold passage 32 may be restricted in its capacity, as indicated at 72, to avoid any sudden change in the wiper speed during this transition period wherein all of the air which enters the motor chamber will be cleaned by the filter body 65.

When the use of the wiper is discontinued, as by moving the control valve 24, 25 to the position shown in Figs. 3 and 4 the supply supports 41, 42 will be closed by the valve 24 and the manifold suction parking port 46 will be connected by the valve passage 54 to the parking port 48 while the motor chamber at the opposite side of the piston will be opened to the atmosphere through the registering of the venting port 55 on the chamber extension port 16'. Concurrently, the valve passage 56 will connect the pump supply port 47 to the atmosphere supply port 51 for causing the pump to intake an adequate volume of filtered air through the filter body before it leaves the filter chamber through the outlet opening 60. Internal staggering ribs 73 formed on the opposing faces of the walls 57, 58 will serve to support the filter body from about the air flow passages 63, 64 to increase the efficiency of the filter. When the wiper is in its parked position it will be observed that the pump suction supply passage is entirely closed off from the windshield cleaner motor and therefore all communication with the manifold will be interrupted to prevent the pump from pulling fuel over into the crankcase and conversely to prevent the manifold suction from pulling oil out of the crankcase into the wiper motor. By extending the filter body about the automatic valve chamber it is possible to increase the capacity of the filter to a practical degree to serve not only as a filter for the air which flows into the wiper motor but also for the air used in ventilating the crankcase. This provides a self-contained air filtering fluid motor unit which will facilitate the installation of the accessory system. The rotary pump may be powered in any suitable manner such as off the cam shaft 74 or it may be driven by an electric motor, if desired. The exhaust from the crankcase ventilation may discharge in a suitable manner as through the pipe 75.

The running port 13 is connected to the supply ports 41 and 42 by the valve passage 43 during which interval the supply ports will be in communication with each other within the valve housing 25. However, when the valve 24, 24' is moved to the wiper parking position by the manual actuator 27 the crankcase ventilating ports 47 and 51 will be placed in communication with each other to function during the relatively longer periods of wiper idleness.

While the foregoing description has been given in detail it is without thought of limitation since the inventive principles involved are capable of assuming other physical embodiments without departing from the spirit of the invention and the scope of the appended claims.

What is claimed is:

1. A windshield cleaner comprising a fluid motor unit installable as such and having a control valve with two suction supply passages, one for manifold connection and one for pump connection, said valve also having a running port, a parking port, a crankcase ventilating port, and a valving member operable selectively to connect both passages jointly to the running port or to connect the pump passage to the ventilating port and the manifold passage to the parking port while disconnecting the running port from both passages.

2. A windshield cleaner comprising a fluid motor having a control valve with two suction supply passages, one for manifold connection and one for pump connection, said valve also having a running port, a parking port, and a crankcase ventilating port, with a valving member operable selectively to connect both passages jointly to the running port or to connect the pump passage to the ventilating port and the manifold passage to the parking port while interrupting the communication with the running port.

3. A windshield cleaner comprising a fluid motor having a chambered body with a removable cover and a piston in the body chamber, automatic valve mechanism operable to reverse the fluid pressure differential on the piston, a filter compartment on the body extended about the mechanism to form a valve chamber therefor and having inner and outer walls joined by end walls, one end wall being formed with an air flow opening, a filter body in the compartment, the cover having a ported valve seat with a crankcase ventilating port opening toward the body in registry with the end wall opening and a second port leading to the automatic valve mechanism, a suction supply passage means, and a control valving member slidable on the seat to connect the ports selectively to the passage means.

4. A windshield cleaner comprising a fluid motor unit having a control valve with a seat formed with two suction supply passages, one for manifold connection and one for pump connection, automatic valve mechanism having two chamber ports and a supply port, the latter opening into the valve seat, said seat also having a parking port and a crankcase ventilating port, and a valving member operable on the seat selectively to connect both passages jointly to the supply port or to connect the pump passage to the ventilating port and the manifold passage to the parking port while closing both passages from communication with one another.

5. A windshield cleaner comprising a fluid motor unit having a self-embodied filter with a motor-running outlet and a crankcase ventilating outlet, and a control valve with two suction supply passages, one for a manifold connection and one for a pump connection, said valve also having a running port, a parking port, a crankcase ventilating port, automatic valve mechanism communicating with the motor-running outlet and operable to actuate the motor unit, and a valving member operable selectively to connect both passages jointly to the running port or to connect the pump passage to the ventilating outlet of the filler and the manifold passage to the parking port while disconnecting the running port from both passages.

6. A windshield cleaner comprising a fluid motor having a chambered body with a piston therein, automatic valve mechanism operable to reverse the fluid pressure differential on the piston, a filter compartment on the body extending about the mechanism to form a valve chamber therefor and having an air outlet opening into the valve chamber and a second air outlet, the chambered body having a removable cover, the latter having a ported valve seat with one port seating upon the second air outlet to establish fluid communication therewith and a second port leading to the automatic valve mechanism, suction supply passage means, and a control valve operable on the seat to connect the ports selectively to the passage.

7. An accessory system comprising in combination with the intake manifold as a primary source of suction and a suction generating pump as a second source of suction, an accessory fluid motor including an automatic valve mechanism operable to reverse the fluid pressure differential on the piston of the motor, a control valve for the motor having a seat with two adjoining ports, one for each source having fluid communication therewith, said seat having a running port, a valving member movable upon the seat and having a port-connecting passage which in one position establishes intercommunication between the three ports and in a second position interrupts the communication between the adjoining ports one with the other and with the running port, and a check valve for each of the adjoining ports acting to preclude one source pulling fluid from the other source into the interposed accessory motor.

8. An accessory system comprising in combination with the intake manifold as a primary source of suction and a suction generating pump as a second source of suction, an accessory fluid motor including an automatic valve mechanism operable to reverse the fluid pressure differential on the piston of the motor, a control valve for the motor having a seat with two adjoining ports, one for each source having fluid communication therewith, said seat having a running port, a valving member movable upon the seat and having a port-connecting passage which in one position establishes intercommunication between the three ports and in a second position interrupts the communication between the adjoining ports one with the other and with the running port, and a check valve for each of the adjoining ports acting to preclude one source pulling fluid from the other source into the interposed accessory motor, said valve seat having a crankcase ventilating port and said valving member having a second passage which in said second position acts to establish communication between the ventilating port and the pump.

9. An accessory system comprising in combination with the intake manifold as a primary source of suction and a suction generating pump as a second source of suction, an accessory fluid motor including an automatic valve mechanism operable to reverse the fluid pressure differential on the piston of the motor, a control valve for the motor having a seat with two adjoining ports, one for each source having fluid communication therewith, said seat having a running port, a valving member movable upon the seat and having a port-connecting passage which in one position establishes intercommunication between the three ports and in a second position interrupts the communication between the adjoining ports one with the other and with the running port, and a check valve for each of the adjoining ports acting to preclude one source pulling fluid from the other source into the interposed accessory motor, said valve seat having a case ventilating port and a parking port, and said valve member having second and third passages, one of which in said second position serves to connect the ventilating port to the pump and the other of which serves to connect the parking port to the manifold.

10. A windshield cleaner system comprising in combination with the intake manifold as a primary source of suction and a suction generating pump as a second source of suction, a wiper, a fluid motor for operating the wiper and including an automatic valve mechanism operable to reverse the fluid pressure differential on the piston of the motor, a control valve for the motor having a seat with two adjoining ports, one for each source having fluid communication therewith, said seat having a running port, a valving member movable upon the seat and having a port-connecting passage which in one position establishes intercommunication between the three ports and in a second position interrupts the communication between the adjoining ports one with the other and with the running port, a check valve for each of the adjoining ports acting to preclude one source pulling fluid from the other source into the interposed accessory motor, and a filter on the motor common to both sources.

No references cited.